Jan. 4, 1966

C. A. RAFFERTY 3,226,986

VERTICAL GYRO ERECTION SYSTEM

Filed Nov. 29, 1962

INVENTOR.
CHRISTOPHER A. RAFFERTY
BY Herbert L. Davis
ATTORNEY

Jan. 4, 1966

C. A. RAFFERTY 3,226,986

VERTICAL GYRO ERECTION SYSTEM

Filed Nov. 29, 1962

INVENTOR.
CHRISTOPHER A. RAFFERTY
BY Herbert L. Davis

ATTORNEY

United States Patent Office 3,226,986
Patented Jan. 4, 1966

3,226,986
VERTICAL GYRO ERECTION SYSTEM
Christopher A. Rafferty, Palisade, N.J., assignor to The Bendix Corporation, Teterboro, N.J., a corporation of Delaware
Filed Nov. 29, 1962, Ser. No. 240,991
7 Claims. (Cl. 74—5.41)

This invention relates to an integrated erection control system for gyro-verticals for use in a vehicle such as an aircraft and more particularly to an improved erection system for gyro-verticals embodying means for deriving true vertical for both pitch and roll attitudes of a craft from air data information and to such a system including means for detecting a malfunction in the vertical erection system, and means for switching from the gyro-vertical erection control system to a gravitational gyro-vertical erection mode of operation.

A free gyroscope tends to remain fixed in space with its spin axis parallel to its original position as the gyroscope support is moved in spaced by the earth's rotation and by motion of the craft mounting the gyroscope relative to the earth. Also, friction, unbalancing, and other disturbing forces cause movement of the gyro axis and results in errors in the gyro position. Thus the axis of the gyro appears to drift from the original position. To maintain the gyroscope spin axis in the original position, precessing forces must be applied to the gyroscope by an erecting device to compensate for the drift from the original position. The erecting device may include a mass acting as a pendulum, but the mass is subject to accelerational forces resulting from angular acceleration due to turning of the craft and linear acceleration due to changes in the velocity of the craft. These accelerational forces cause the erecting device to erroneously precess the gyroscope about the mutually perpendicular pitch axis and bank axis of the gyroscope, which axes are normally coincident with the pitch axis and bank axis of the craft.

The linear accelerational force acting on a pendulum carried by a moving craft is proportional to the rate of change of ground speed of the craft. Also, the centrifugal forces acting on a pendulum carried by a moving craft while making a turn is proportional to the ground speed of the craft and the rate of change of flight path about the vertical. True airspeed may be used in the computations instead of ground speed inasmuch as true airspeed is more easily obtained from aircraft instruments. Any error introduced into the system because of a difference between the true airspeed and the ground speed is negligible for the speeds of craft in which the system is especially adapted for use on a reasonably long-term basis. Also, the true airspeed used in the computation may not necessarily be compensated for the effects of temperature variations from those assumed in a standard atmosphere.

It is, therefore, an object of the invention to provide a gyro-vertical erection system embodying a pendulum and including means referenced with respect to the true airspeed of the craft carrying the gyroscope so as to compensate for erroneous precessing of the gyroscope about its pitch and bank axis in response to linear and angular accelerational forces acting on the pendulous erecting system.

Another object of the invention is to provide a system including means for initiating a control signal approximating the rate of change of true airspeed of a craft and a vertical gyroscope means having a spin axis together with means referenced with respect to the rate of change of true airspeed of the craft for correcting the gyroscope for displacement of the spin axis in the plane of pitching motion of the craft from a true vertical as well as means cooperating therewith referenced with respect to the true airspeed of the craft for correcting the gyroscope for displacement of the spin axis from true vertical in the plane of banking motion of the craft.

It is a further object of the invention to provide an erection system for a craft mounted vertical gyroscope having pitch and bank axes with a pitch servo having a pendulous rotor constrained to move only in the plane of pitching of the craft for instituting a pitch erection control signal, a pendulous rate gyro constrained to move only in the plane of banking of the craft to institute a bank erection control signal, and means responsive to the control signals for erecting the vertical gyroscope in pitch and bank senses.

It is another object of the invention to provide monitoring means for monitoring the erection signal of a gyro-vertical erecting system which initiates a control signal in response to a sustained erection signal which exceeds a permissible operating value.

The invention further contemplates the provision of means for deriving an electrical signal which approximates the rate of change of true airspeed of a craft; gyroscope stabilizing means referenced with respect to the true airspeed signal for erecting a vertical gyro about its bank axes and having a pitch erection control channel including a pitch servo having a pendulous portion constrained to move about the pitch axis of the vertical gyro, and an output which is a function of the gyroscope error from true vertical and proportional to the longitudinal acceleration of the craft, together with means comparing the pitch synchro output with the rate of change of true airspeed of the craft to derive a pitch signal proportional to the displacement of the vertical gyro spin axis from true vertical in the plane of pitching motion of the craft, and means responsive to the pitch error signal for precessing the vertical gyroscope in pitch so as to effect erection of the vertical gyroscope in pitch.

It is also contemplated to provide a bank erection control channel including a pendulous gimbal mounted gyroscope constrained to move only in the plane of banking of the craft mounting a variable speed rotor wheel with its axis of rotation extending parallel to the pitch axis of the craft, means referenced with respect to the true airspeed signal to vary the rate of speed of the variable speed rotor to maintain the rate gyroscope gimbal in a horizontal plane together with synchro means operatively connected to the rate gyroscope to institute a bank error signal proportional to the displacement of the vertical gyro spinaxis from true vertical in the plane of banking motion of the craft, and means responsive to the bank error signal for precessing the vertical gyro in bank to effect erection of the vertical gyro in bank.

This invention further contemplates the provision of monitoring means responsive to sustained pitch and bank signals above permissible limits to institute a control signal and means for switching from controlled erection to gravitational erection of the vertical gyroscope.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the drawings, wherein like reference characters refer to like parts throughout the respective views.

Figure 1:
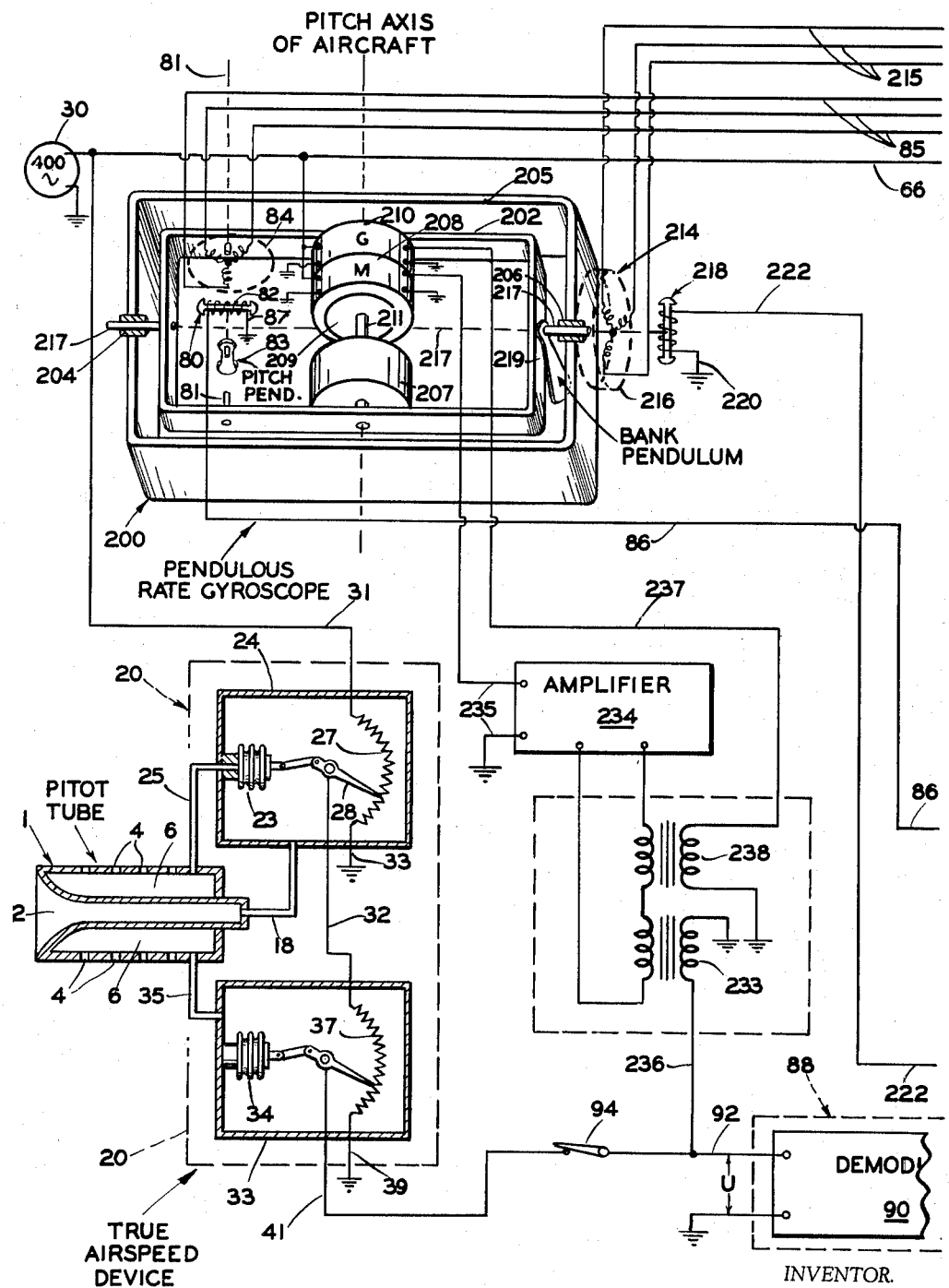
FIGURE 1 is a schematic illustration of a part of the gyro vertical erection control system including the pendulous rate gyroscope.

Referring to the drawings, there is indicated by the numeral 1, an air pressure probe of conventional type such as a pitot tube which may be in the free airstream and mounted on the airfoil of an aircraft so as to sense through the passage 2 impact or total pressure which increases with the speed of the aircraft. The static atmospheric pressure is further sensed through passages 4 in the side of the pitot tube 10 and leading to a passage 6.

As shown in the drawing, the impact or total pressure is applied through a conduit 18 to a pressure sensing mechanism or transducer assembly 20 including a first sensing means comprising a diaphragm 23 and potentiometer pick-off combination. The diaphragm 23 is preferably of a bellows type and is enclosed in a chamber 24. The interior of the bellows diaphragm 23 is connected to the static atmospheric pressure through a conduit 25 leading from the passage 6 while the chamber 24 which encloses the diaphragm bellows 23 is connected to a source of total pressure through a conduit 18 leading from the passage 2 of the pitot tube 1 carried by the craft mounting the pressure sensing mechanism 20.

A potentiometer 27 has an adjustable arm 28 which is operated by the sensing means 23. The potentiometer 27 is excited by a suitable source 30 of alternating current which is connected thereto through a conductor 31 and ground connector 33. The voltage output of the potentiometer 27 of the sensing means 23 is proportional to the square root of the difference between the total pressure $P_T$ applied through the line 18 and the static pressure $P_S$ applied through the line 25. The arrangement is such that an output signal voltage is applied through a line 32. This output voltage may be represented mathematically as the square root of $q_c$.

The pressure sensing mechanism 20 is further provided with a second sensing means comprising a diaphragm 34 which may be of a bellows type enclosed in a chamber 33. The interior of the bellows 34 may be evacuated while the chamber 33 which encloses the diaphragm bellows 34 is connected to a source of total static pressure through a lead 35 opening to a passage 6 in the pitot tube 1. A potentiometer 37 is operatively controlled by the diaphragm bellows 34. The potentiometer 37 is connected at one end to the output lead 32 while the opposite end is connected to the source of alternating current 30 through the ground connection 39. The output lead 32 of the sensing means 23 is thus connected to the potentiometer 37 of the second sensing means 34 to thereby excite the potentiometer 37. There is an output lead 41 from the arm of the potentiometer 37. The diaphragm bellows 34 of the second sensing means 33 varies the effect of the potentiometer 37 as a direct function $(f_1)$ of the variation in the static pressure $(P_s)$.

The combined output voltages of the first and second sensing means 23 and 34 applied through the output lead 41 is, therefore, product of the potentiometer output voltages of sensing means 23 and 34 which may be mathematically represented as $\sqrt{q_c} \quad f_1 \ (Ps)$, in which $q_c = P_T - P_s$ ($P_T$=total pressure and $P_s$=static pressure) and which in turn is an approximation of true airspeed (U) of the craft. The voltage output U of the pressure sensing mechanism 20 is fed through the lead 41 into a true vertical computer, as hereinafter explained. The true vertical computer includes a pitch error control channel and a bank error control channel for controlling the vertical gyroscope, indicated generally by the numeral 22 and shown in FIGURE 1A.

VERTICAL GYRO

The schematically shown vertical gyro controlled system of the drawings may include a vertical gyro 22 of conventional type mounted in a case 50 carried by the aircraft and including pitch and bank gimbals 51 and 52 movable angularly about mutually perpendicular axes including pitch axis 53 and bank axis 54. The vertical gyro 22 includes a pitch inductive device such as pitch erection synchro 56 mounted on the gimbal 52 and positioned coaxial with respect to the pitch axis 53 of the vertical gyro 22. The synchro 56 has a rotor 57 mechanically connected to the inner pitch gimbal 51 and a stator 59 mechanically connected to the outer bank gimbal 52. The rotor 57 is connected to a suitable source of alternating current 30.

A pitch torquer 61 may be of a conventional two phase type having a suitable control winding 62 electrically controlled by the pitch erection synchro 56 and is operative to apply a torque to the bank gimbal 52 so as to drive the rotor 57 to a null signal position and precess the pitch gimbal 51 about the vertical gyro pitch axis 53 in response to an exciting voltage.

The pitch synchro 56 produces a voltage which is a function of the angle of tilt of the gyroscope about the vertical gyro pitch axis 53 in a manner which will more clearly appear hereinafter.

The vertical gyro 22 also includes a bank inductive device such as a bank erection synchro 64 mounted coaxial with respect to the bank axis of the vertical gyro 22. The synchro 64 has a rotor 63 operatively connected to the outer bank gimbal 52 and a stator 65 connected to the gyro case or support 50. The rotor 63 is connected to the source of alternating current 30 through conductor 66. Bank torquer 67 is electrically controlled by the bank synchro 64 and is operative to apply a torque to pitch gimbal 51 so as to drive rotor 63 to a null signal position and to precess the bank gimbal 52 about the vertical gyro bank axis 54 in response to an exciting voltage.

The vertical gyro 22 also includes a pendulous pitch reference synchro means 68, a pendulous bank reference synchro means 69, and operator-operative switch 70 including switch elements 71 and 72 switching from the control system of this invention to a mode of free gravitational erection for the vertical gyro 22. The operation of the vertical gyro in both the controlled and free modes of operation will more clearly appear from the following description.

TRUE VERTICAL COMPUTER

The true vertical computer, as beforementioned, comprises a pitch error control channel and a roll error control channel for controlling vertical gyro 22. The pitch error control channel will be first described.

The pitch error control channel comprises a pitch pendulum synchro 80 having a pendulous rotor 82 with an axis of rotation 81 normally perpendicular to the spin axis or true vertical of the vertical gyro 22. The rotor 82 is adjustably positioned by a vertically extending pendulum 83 which is restrained to move about the horizontally extending axis 81 which in level flight, is the pitch axis of the aircraft. Synchro 80 further has a stator 84 mounted on the gimbal 202 of the pendulous rate gyroscope 200 with windings connected through parallel leads 85 back to back to the stator 59 of synchro 56.

Figure 1A:
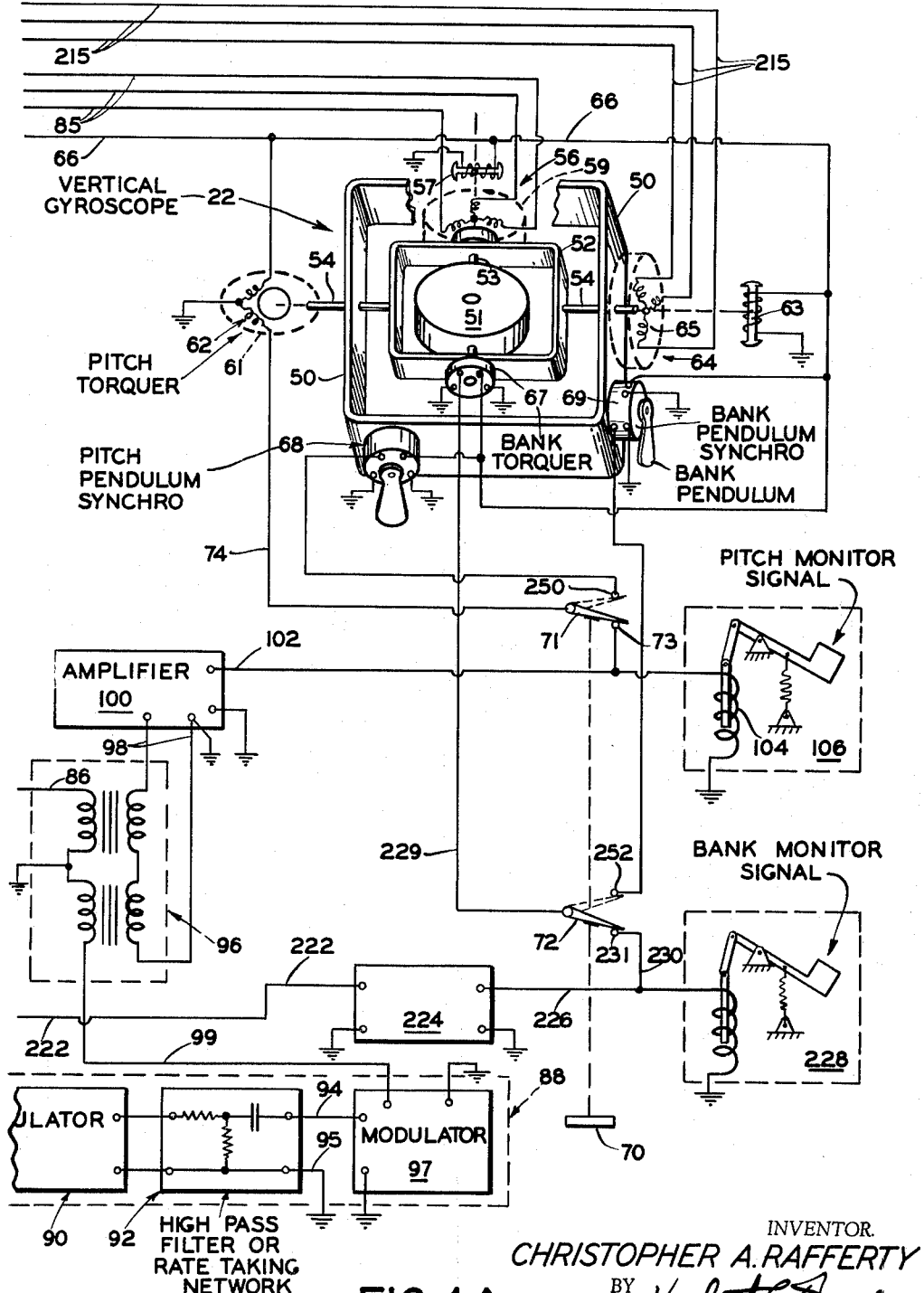
FIGURE 1A is a schematic illustration of a second part of the control system including the vertical gyroscope. The complete control system embodying the invention is illustrated by combining the schematic illustration of FIGURE 1A with that of FIGURE 1.

Output lead 41 from pressure transducer assembly 20 connects to a rate taking device 88 of conventional type, and shown in FIGURES 1 and 1A. The rate taking device 88 includes a demodulator 90 having an input line 92 connected through an operator-operative switch 94 to the output lead 41 from the pressure sensing mechanism 20 so as to apply to the input of the demodulator 90 a voltage which is an approximation of true airspeed (U) of the craft.

The output of the demodulator 90 is in turn applied to a high pass filter or rate taking network 92 so as to apply across output lines 94–95 of the rate taking network 92 a signal voltage which is proportional to the angle the pendulum 83 would hang off the true vertical due to rate of change of longitudinal velocity or airspeed of the aircraft.

The output leads 94 and 95 connect through a modulator 97 and output 99 to summing or isolation transformers 96. The winding of rotor 82 of synchro 80 is electrically connected to ground at 87 and through conductor 86 is also connected to the isolation or summing transformers 96. Output conductors 98 lead from the summing transformers 96 to the input of an amplifier 100. Conductor 102 connects the output of amplifier 100 to a control solenoid 104 of monitor 106 while output conductor 102 also connects the output of amplifier 100 to the control winding 62 of the pitch torquer 61 through a switch element 71 normally closing a switch contact 73 and leading through a conductor 74 to the central winding 62.

The axis 81 of the pendulous rotor 82 of synchro 80 normally extends perpendicular to the spin axis of the vertical gyroscope of the system 12, which spin axis is normally aligned with the vertical and the pendulum 83 is constrained to move only in the plane of pitching movement of the craft mounting the gyroscope. The pendulous rotor 82 has a tendency to align itself with true vertical as the craft pitches, but also has a tendency to be deflected from true vertical about the gyro pitch axis when the craft is under sustained acceleration. The synchro rotor 82, when deflected relative to the stator 84, produces an output voltage proportional to its deflection from its normally aligned position with respect to the true vertical of the gyro.

It will be seen then that the output of rotor 82 applied through lead 86 is a voltage which is proportional to the gyro error from true vertical and is additionally proportional to the longitudinal acceleration which deflects the pendulous rotor 82. This output voltage which may be properly called a sensed pendulum angle voltage ($\theta_p$) is compared with the computed pendulum angle voltage ($\theta_g$) derived from the rate taking network 88 and applied through transformers 96.

The computed pendulum angle voltage, as beforementioned, varies as a function of the rate of change of the true airspeed of the craft with respect to time. Also, the sensed pendulum angle voltage is proportional to the gyro error from true vertical and proportional to the longitudinal acceleration of the craft causing deflection of the pendulum 83.

The output error voltage from the summing isolation transformers 96 is applied through leads 98. This error voltage is the difference between the sensed and computed pendulum voltage, and therefore, represents the error of the spin axis of vertical gyro 22 from true vertical in the plane of pitching motion of the craft mounting the gyro. This error voltage $E_p$ is applied to the input of pitch erection amplifier 100 where it is amplified. The error voltage $E_p$ is then applied to monitor 106 through the amplifier output lead 102, later to be described in more detail, and to the pitch torquer 61 of the vertical gyro 22 through output lead 102.

The pitch torquer 61 in response to the error voltage $E_p$ applies a torque to the bank gimbal 52 so as to precess the gimbal 51 about the pitch axis 53 and position the rotor 57 of pitch synchro 56 to null and additionally precesses the pitch gimbal of vertical gyro 22 about the vertical gyro pitch axis 53 to effect erection of the vertical gyro in the plane of the gyro pitch axis.

PENDULOUS RATE GYROSCOPE

The bank error control channel comprises a pendulous rate gyroscope 200 supported on a gimbal 202 mounted on gimbal bearings 204 and 206 of a casing 205 which is in turn affixed to casing 50 of the vertical gyro 23. The bearings 204 and 206 are aligned in parallel relation with the bank axis 54 of vertical gyro 22. The gimbal 202 is adjustably positioned about axis 217 by a pendulum 219 affixed to the gimbal 202. Suitable damping means may be provided between gimbal 202 and the case 205 so as to prevent undesirable oscillations.

Further mounted on gimbal 202 perpendicular to the gimbal bearings 204 and 206 is a rate gyro wheel 207 driven by a variable speed motor 208 which is also drivingly connected to a rate generator 210. The gyro wheel 207, rotor of motor 208, and rotor of rate generator 210 are mounted on a shaft 211 and drivingly connected thereby while the stator of motor 208 and the stator of the rate generator 210 are affixed to the gimbal 202.

The wheel 207, the rotor 209 of motor 208, and the rotor of generator 210 may be mounted on shaft 211 and arranged so that all rotate at the same speed or the same may be mounted on a common wheel in a manner well known in the art. A speed control circuit including an amplifier 234 has output leads 235 connected in controlling relation to motor 208 which may be of a conventional variable speed two phase type having a control winding connected across the output leads 235. A conductor 236 leads from the switch arm 94 so as to apply to the input of the amplifier 234 through an isolation transformer 233 the voltage applied through lead 41 and switch arm 94, and which voltage is directly proportional to the true airspeed U of the aircraft.

The rate generator 210 applies an output voltage through a negative feedback circuit 237 to the input of the speed control amplifier 234. This negative feedback voltage is applied through isolation transformer 238 in opposition to the speed controlling signal applied through the isolation transformer 233 in such a manner that the speed at the rate gyroscope wheel 207 is varied as a direct function of the airspeed of the craft, as hereinafter explained.

There is further provided a signal output variable inductive device such as bank synchro 214 having a stator 216 and a rotor 218. The synchro stator 216 is fastened to the casing 205 while the synchro rotor 218 is mechanically connected to a shaft 217 projecting from gimbal 202. The stator winding 216 of synchro 214 is electrically connected back to back to the stator winding 65 of bank erection synchro 64 of the vertical gyro 22. The winding of the rotor 218 of synchro 214 is connected at one end to ground at 220 and at the opposite end is connected by a lead 222 to the input of bank torquer amplifier 224.

Amplifier 224 in turn is connected by lead 226 to monitor 228 and by lead 230 through the switch element 72 normally closing a contact 231 to connect lead 230 through a conductor 229 to the control winding of the bank torquer motor 67 of the vertical gyro 22. The speed control circuit for the motor 208 includes the amplifier 234, which, with the switch 94 in the closed position, is excited by the voltage applied through lead 41 which is a function of the true airspeed U and a voltage input from the rate generator 210 driven through shaft 211 by the motor 208 so that the speed of the rate wheel 207 is varied as a function of the airspeed of the aircraft. The arrangement is such that, as hereinafter explained, the pendulum 219 affixed to the gimbal 202 always hangs vertical and the gimbal 202 is maintained thereby in a horizontal position.

The aforedescribed structure of the pendulous rate gyroscope is described and claimed in a copending U.S. application for Patent Serial No. 240,997, filed on even date herewith by Charles E. Hurlburt, and assigned to The Bendix Corporation. This structure is not claimed in the present specification.

In the improved structure of the present invention, it will be further seen from the drawing that the axis 217 of the pendulous rate gyro gimbal 202 extends perpendicular to the axis of the pitch pendulum synchro 80 and the arrangement is such that the axis of the pitch pendulum synchro 80 is maintained in a horizontal position by the action of the vertically hanging pendulum 219 on the gambal 202 so as to eliminate an error which would exist if the axis of the pendulum 83 were allowed to assume the bank angle of the craft.

The speed control amplifier 234 is connected to variable speed motor 208 of rate gyro wheel 207 by lead 235, which motor 208 is connected in driving relation to the generator 210. The output of rate generator 210 is connected in a feedback circuit to the input of speed control amplifier 234. The speed of rate wheel 207 is, therefore varied as a direct function of the true airspeed of the craft for a purpose which will more clearly appear.

The pendulous rate gyro gimbal 202 is constrained to move only in the plane of banking motion of the craft mounting the gyro. The pendulous rate gyro is restrained from precessing about its roll axis on bearings 204 and 206 only by the pendulosity associated with the gimbal 202.

For a given rate of co-ordinated turn of the craft mounting the gyro 200, a given degree of pendulosity associated with the gyro gimbal 202, and a fixed angular momentum, there is one definite true airspeed at which the gimbal 202 will be maintained in a horizontal plane. Under these conditions, the precessional torque produced by the rotational gyroscopic effect of the rate gyro wheel 207 tending to maintain gimbal 202 in a horizontal position is equal and opposite to the torque produced by centrifugal force on the gimbal mass unbalance.

The centrifugal forces on the pendulous gyro gimbal 202, when the craft mounting the gyro is in a level co-ordinated turn, varies as a direct function of the velocity of the craft and the rate of turn of the craft. It will be seen, therefore, that if the angular momentum of the rate gyro wheel 207 is varied linearly as a direct function of the true airspeed of the craft, the gyro gimbal 202 will be maintained in a horizontal plane for all co-ordinated turns at all airspeeds. To achieve this end, the speed control circuit, including the amplifier 234, is so provided as to drive rate gyro motor 208 and the rate generator 210 at a rate proportional to the true airspeed of the craft.

The rate generator 210 is so calibrated as to generate a signal proportional to the rate of the speed of rotation of the gyro wheel 207, and which signal is fed back through lead 237 into the input of amplifier 234 in opposition to the controlling input voltage proportional to U so as to assure that the speed of rotation of the gyroscopic rotor 207 is proportional to the true airspeed of the craft.

The speed of rotation of the rate gyro wheel 207 is by this means accurately maintained proportional to the true airspeed U of the craft. This assures that the pendulum 219 will always hang in a vertical position irrespective of the airspeed of the craft and the rate of turn thereof. This result is effected because the gyroscopic torque effected by the wheel 207, motor 208, and generator 210, which has a rotational speed proportional to the airspeed of the craft, is balanced by the torque due to the centrifugal force on the pendulous mass 219 attached to the gyro gimbal 202. Thus the pendulum 219 will hang vertical and the axis 81 of the pitch pendulum synchro 80 will be maintained in a horizontal position.

The stator 216 of synchro 214, as beforementioned, is mechanically connected to the casing 207 and the rotor 218 is adjustably positioned by shaft 217 projecting from gimbal 202. It will be seen, therefore, that upon movement of gyro gimbal 202 about the bank axis of the rate gyro on bearings 204 and 206, an error voltage will be induced in synchro 214.

This bank error or voltage $E_b$ represents the deviation of the bank axis of vertical gyro 22 from true horizontal or the spin axis of vertical gyro 22 from true vertical in the plane of banking motion of the craft mounting the gyro. The bank error voltage is fed from windings of the stator 65 of synchro 62 through parallel leads 215 to the windings 216 of synchro 214 and in turn induced into the winding of synchro rotor 218 and through output lead 222 to the input of bank erection amplifier 224 where it is amplified. The error voltage $E_b$ is then applied to monitor 228 through lead 226, later to be described in more detail, and to the bank torquer 67 in the vertical gyro 22 through lead 230, switch 72 and lead 229.

The bank torquer 67 in response to the error voltage $E_b$ applies torque to the pitch axis 53 to precess the bank gimbal 52 of vertical gyro 22 about the bank axis 54 to effect erection of the vertical gyro on the plane of the gyro bank axis and adjust the rotor 63 of the bank synchro 62 to a null signal position.

It will be appreciated from the foregoing that the true vertical computer of this invention comprises new and novel pitch and bank erection control channels for a vertical gyro.

The pitch control channel has as a main component a pendulous pitch synchro wherein the pendulum portion of the synchro is constrained to move only about the pitch axis of the gyroscope to institute a control signal referenced with respect to rate of change of airspeed of the craft which is proportional to the displacement of the gyro pendulum from true vertical about the pitch axis of the vertical gyro to effect erection of the vertical gyro about the pitch axis.

The bank control channel has as a main component the pendulous rate gyroscope 200 wherein the pendulous portion 219 of the rate gyroscope is constrained to move only about the bank axis of the gyroscope, and there is further provided a variable speed rate wheel 207 mounted on the rate gyroscope, the speed of which varies directly as the true airspeed of the craft.

The rate wheel 207 automatically compensates the rate gyroscope for the dynamic displacement of the pendulous portion 202–219 thereof from true vertical due to angular acceleration of the craft.

A bank synchro 214 is operatively connected to the rate gyroscope. The bank synchro, therefore, institutes a control signal referenced with respect to the true airspeed of the craft which is proportional to the displacement of the pendulous portion 202–219 of the gyro from true vertical about the bank axis of the vertical gyro to effect erection of the vertical gyro about the bank axis.

SAFETY SYSTEM

A pitch monitor 106 is connected to pitch erection amplifier 100 and a bank monitor 228 is connected to the output of bank erection amplifier 224. The error signals $E_p$ and $E_b$ fed into the pitch and bank erection amplifiers are normally very small. If these signals become large for a sustained length of time indicating erratic maneuvering of the craft, the controlled erection system cannot maintain the vertical gyro properly precessed in pitch and bank. Therefore, the monitors initiate a control signal to sound a warning or the like in response to a sustained error signal $E_p$ or $E_b$.

In response to this warning signal the pilot may, therefore, actuate switch 70 to switch elements 71 and 72 from their normal position, closing contacts 73 and 231 to an emergency position to close contacts 250 and 252, respectively, to inactivate the pitch and bank error control channels and activate the pendulous pitch reference 68 and the pendulous bank reference 69 of the vertical gyro. Thus, the vertical gyro will effect self erection.

Although several embodiments of the invention have been illustrated and described, various changes in the form and relative arrangement of the parts, which will now appear to those skilled in the art may be made without departing from the scope of the invention. Reference, therefore, is to be had to the appended claims for a definition of the limits of the invention.

What is claimed is:

1. A pendulous rate gyroscope comprising a gimbal, first means to pivotally mount the gimbal about a bank axis of an aircraft, a pendulum affixed to the gimbal and pivotal about the bank axis, a pendulous signal device, second means to pivotally mount the signal device in the gimbal and on an axis perpendicular to the bank axis and extending parallel to the pitch axis of the aircraft, motor means including a rotatable element, third means to rotatably mount the element in the gimbal and on an axis perpendicular to the bank axis and parallel to the pitch axis of the aircraft, means operatively connected to said motor means and responsive to a signal representing true airspeed of said aircraft for controlling the speed of rotation of said motor means as a direct function of the speed of the aircraft and in a sense to cause the pendulum to hang vertical and the gimbal and the axis of the pendulous signal device to be maintained in a horizontal position during flight maneuvers of the aircraft under varying operating conditions thereof.

2. A pendulous rate gyroscope comprising a gimbal, means to pivotally mount the gimbal about a bank axis of an aircraft, a first pendulum affixed to the gimbal and pivotal about the bank axis, a rotatable signal device including a first shaft mounted in the gimbal and extending perpendicular to the bank axis and parallel to a pitch axis of the aircraft, a second pendulum affixed to the first shaft to adjustably position the rotatable signal device in response to a maneuver of the aircraft about the pitch axis thereof, a second shaft mounted in the gimbal and projecting perpendicular to the bank axis and parallel to the pitch axis of the aircraft in spaced relation to the first shaft, motor means including a rotatable element mounted on said second shaft, means operatively connected to said motor means and including means responsive to a signal represeting true airspeed of said craft for controlling the speed of rotation of said motor means as a direct function of the speed of flight of the aircraft and in such a manner as to cause the first pendulum to hang vertical and the gimbal to be maintained in a horizontal position so as to cause the second pendulum to hang veritcal from the first shaft under varying condition of flight of the aircraft.

3. The combination defined by claim 2 in which the motor means includes a rotor mounted on said second shaft, a signal rate generator including a rotatable element mounted on said second shaft, the rotatable element of said motor means being drivingly connected to said rotor and rotatable element of said signal rate generator in an arrangement such that the rotor, the rotatable element of the motor means and the rotatable element of the signal rate generator rotate at the same speed, and means operatively connected to an output of said rate generator for applying a negative feedback signal from said signal rate generator to the means operatively connected to said motor means and acting in opposition to the controlling signal representing true airspeed of the aircraft and in such a manner that the speed of rotation of the motor means is varied as a direct function of the speed of flight of the aircraft whereupon the first and second pendulums hang vertical and the gimbal is maintained in a horizontal position.

4. A gyroscopic control system comprising first means for effecting a first control signal proportional to true airspeed of a craft, second means for effecting a second control signal proportional to the rate of change of the airspeed of said craft, a vertical gyroscopic means carried by said craft and including a rotor and a spin axis for the rotor, means operatively connected to said second means and responsive to said second control signal for torquing the gyroscopic means in opposition to displacement of the spin axis in the plane of pitching motion of the craft from a vertical position, and other means operatively connected to said first means and responsive to said first control signal for torquing the gyroscopic means in opposition to displacement of the spin axis of the gyroscopic means in the plane of banking motion of the aircraft.

5. In a gyroscopic control system, the combination comprising a vertical gyroscope, means for deriving an electrical signal proportional to the rate of change of true airspeed of an aircraft carrying the vertical gyroscope, gyroscopic stabilizing mans operatively connected to said first mentioned means and referenced with respect to the rate of change of true airspeed of the craft to provide a pitch error signal proportional to displacement of the gyroscopic spin axis from true vertical in a plane of pitching motion of the aircraft, and means operatively connected to said stabilizing means and responsive to the pitch error signal for effecting precession of the vertical gyroscope in pitch to effectively torque the vertical gyroscope spin axis to the true vertical position.

6. A gyroscopic control system comprising in combination a vertical gyroscope having a pitch axis and a bank axis, a pendulous rate gyroscope, first means for providing an electrical signal which approximates true airspeed of an aircraft carying the vertical and pendulous rate gyroscopes, said pendulous rate gyroscope having a pendulous portion constrained to move about a bank axis of the aircraft, second means for providing an electrical signal which approximates a rate of change of the true airspeed of the aircraft, stabilizing means including the pendulous rate gyroscope, said pendulous rate gyroscope being operatively connected to said first means and referenced with respect to the true airspeed signal, and a bank torquer operatively controlled by said pendulous rate gyroscope for erecting the vertical gyroscope about its bank axis, said stabilizing means including a pitch servo having a pendulous portion constrained to move about the pitch axis of the aircraft, said pitch servo providing an output signal which is a function of the error of the vertical gyroscope from a true vertical position and proportional to the longitudinal acceleration of the aircraft, means operatively connected to said second means and said pitch servo for comparing the pitch servo output signal with said signal which approximates the rate of change of true airspeed of the craft so as to provide a signal proportional to displacement of the gyroscope spin axis from the true vetrical position in a plan of pitching motion of the aircraft, and torquing means operatively connected to said comparing means and responsive to said last-mentioned signal for effecting precession of the vertical gyroscope in pitch to a true vertical position.

7. In an aircraft, the combination comprising a vertical gyroscope having a pitch axis and a bank axis, a pendulous rate gyroscope, said gyroscopes being carried by the aircraft, the pendulous rate gyroscope having a gimbal pivotal in the plane of banking movement of the aircraft, a variable speed motor carried by said gimbal and having a rotor with an axis of rotation extending parallel to the pitch axis of the aircraft, means to effect a signal proportional to airspeed of the aircraft, means operatively connected to the last mentioned means and controlled by the airspeed signal to drive the rotor at a speed proprotional to the airspeed of the aircraft so as to maintain the gimbal of the rate gyroscope in a horizontal plane, signal generator means operatively connected to the gimbal of the rate gyroscope to effect a bank error signal, and bank torquing means operatively connected to the signal generator means and responsive to the bank error signal for precessing the vertical gyroscope about the bank axis thereof so as to maintain the vertical gyroscope in a predetermined vertical position, another signal generator means carried by the gimbal of the pendulous rate gyroscope, said other signal generator means having a pendulous rotor constrained to move in the plane of pitching motion of the aircraft for effecting a first pitch sign, means to effect a second signal proportional to rate of change in the airspeed of the aircraft, a summing transformer having input means operatively connected to said other signal generator means and said rate of change signal effecting means for providing at an output means a signal equivalent to an algebric sum of the first and second signals, a pitch torquing means operatively connected to the output means of said summing transformer for effecting precession of the vertical gyroscope in pitch to a reference vertical position dependent upon the second signal proportional to the rate of change in the airspeed of the aircraft.

References Cited by the Examiner
UNITED STATES PATENTS 2,630,017 3/1953 Slater _____ 74—5.34 X
2,786,357 3/1957 Quermann et al. _____ 74—5.7

MILTON KAUFMAN, *Primary Examiner.*
BROUGHTON G. DURHAM, *Examiner.*